June 5, 1962  M. J. CONWAY  3,037,753
GAS SCRUBBER

Filed Nov. 19, 1956

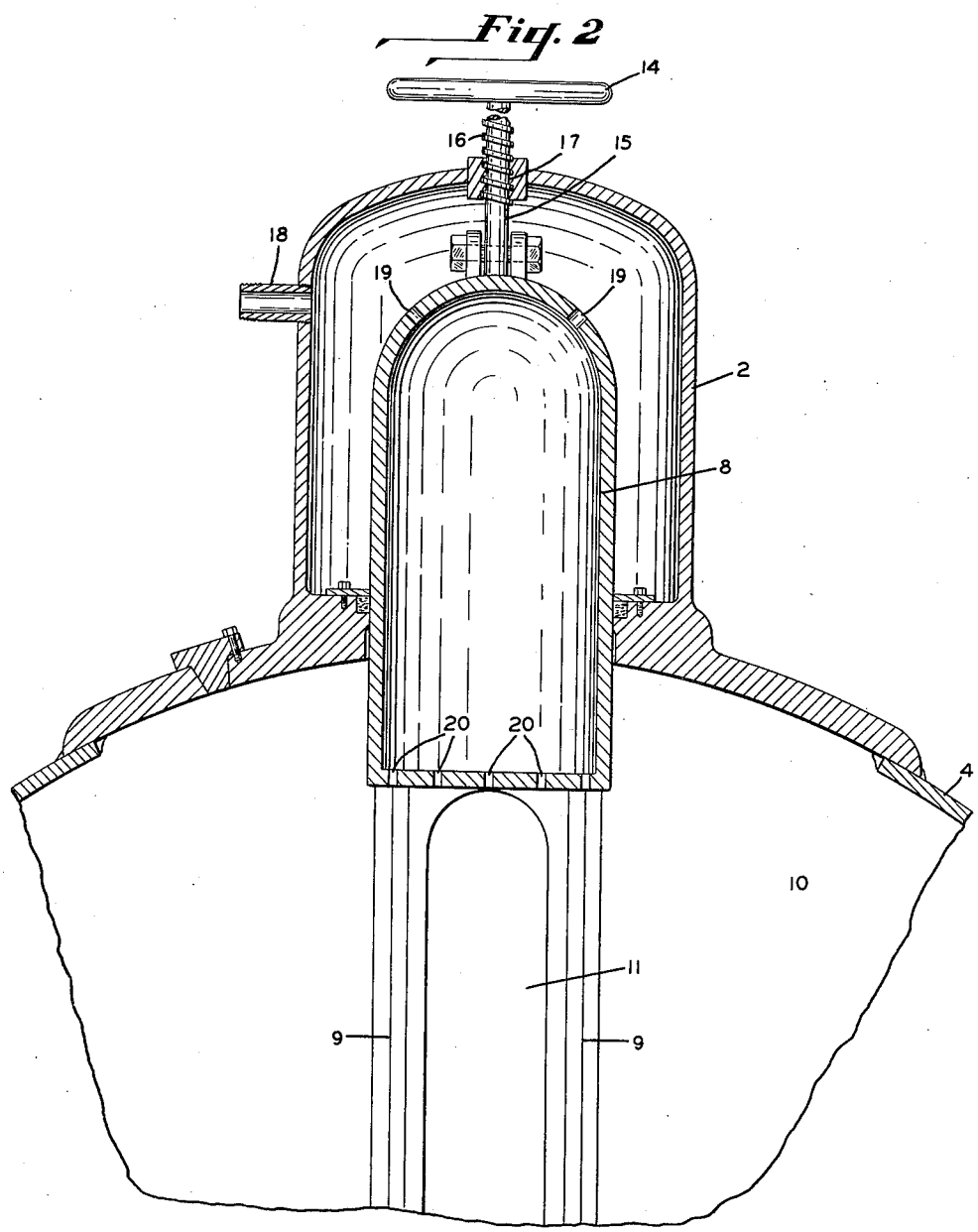

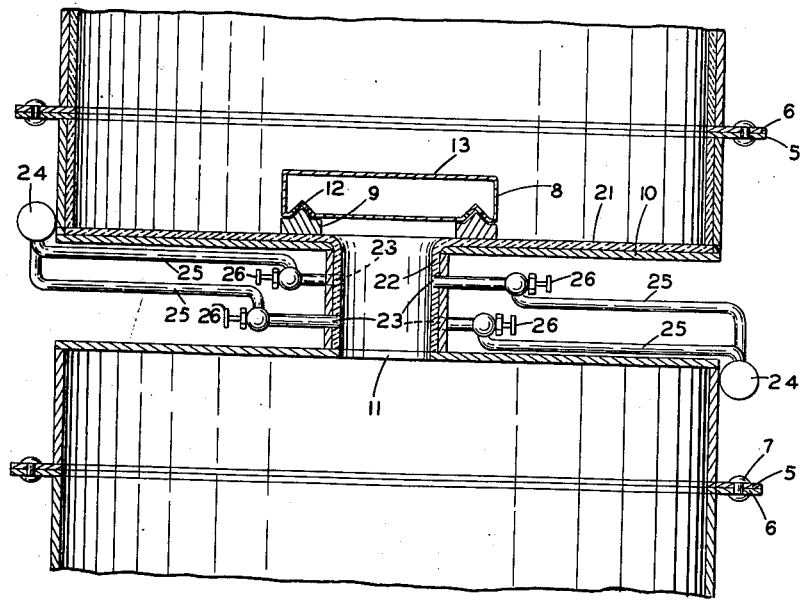
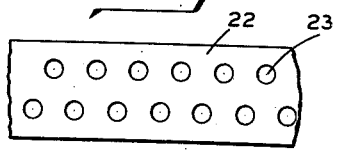
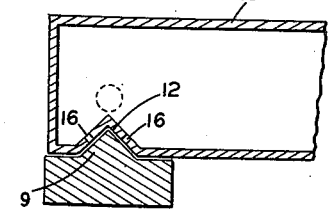

United States Patent Office 3,037,753
Patented June 5, 1962

3,037,753
GAS SCRUBBER
Martin J. Conway, Millersville, Pa., assignor to M. J. Conway, Inc., Millersville, Pa., a corporation of Pennsylvania
Filed Nov. 19, 1956, Ser. No. 622,978
1 Claim. (Cl. 261—64)

This invention relates to an apparatus for scrubbing gases and more particularly to apparatus for regulating the flow and removing dust and other objectionable suspended matter such as obnoxious vapors and fumes entrained in gas streams.

In the conventional operation of blast furnaces, it has been common practice to pass the exhaust gas through a dust catcher and then to a gas washer. The gas washer is a vertical receptacle having various baffles and water inlets which form a circuitous path of travel from the bottom where the gas enters the washer to the top where the scrubbed gas is released. As the gas works its way through and around the baffles, it is exposed to the water which absorbs the dust and other foreign matter and carries it to the drain located at the bottom of the washer.

Many attempts have been made to remove a major portion at least of this gas entrained foreign matter before the gas enters the gas scrubber. The most logical place to do this, of course, is to place a dirt removing device in the line leading from the dust collector to the gas scrubber. One of the most common devices is the Venturi system disclosed in United States Patent 2,604,185 issued July 22, 1952. One of the chief disadvantages of the Venturi system is the size of the device which must be inserted in the gas line in order to have a satisfactorily operating Venturi system. It should be borne in mind that on many of the blast furnaces in operation today the hot gas line leading from the dust catcher to the gas washer is approximately 8' in diameter. In order to install a satisfactorily operating Venturi system in a gas line of this type, the Venturi must of necessity be approximately 50' in length. A great dial of time and expense is required to install and also to repair a Venturi device of this size.

In order to overcome the disadvantages of the prior art system enumerated above, the device of this invention has been developed which may be readily installed in a pipe by inserting a unit no greater than 5' in length into the existing duct between the dust collector and the gas washer. This unit may be readily installed and removed for a replacement if necessary without shutting down the operation of the furnace for any appreciable length of time. This device not only washes a major portion of this entrained foreign matter from the gas but it also provides means for regulating the flow of gas through the gas line, and also means for cooling the gas.

An object of this invention is to provide a device which will inject sufficient water into the stream of gas moving from the dust catcher to the gas washer to remove a major portion of the foreign matter entrained in the gaseous stream.

Another object of this invention is to supply sufficient water to the gas stream to materially reduce the temperature of the gas to such an extent that it will not have the usual temperature shock effect on the lower portion of the gas washer.

A further object of this invention is to provide a device which may readily be installed in existing equipment without making any major alteration requiring a substantial amount of down-time on the furnace.

A still further object of this invention is to provide a device for insertion in a gas line to regulate the flow of gas through the line to insure efficient operation of the system.

In order that this invention may be more readily understood, it will be described in connection with the attached drawing in which FIGURE 1 is a diagrammatic view of a dust catcher and gas washer with the device of this invention installed in the gas line therebetween.

FIGURE 2 is a sectional view of the valve showing the operating mechanism of the same.

FIGURE 3 is an enlarged sectional view of the valve sliding arrangement.

FIGURE 4 is a cross sectional view of the gas conduit showing the device in position, and FIGURE 5 is a diagrammatic view of the arrangement of the water jets.

Figure 1:
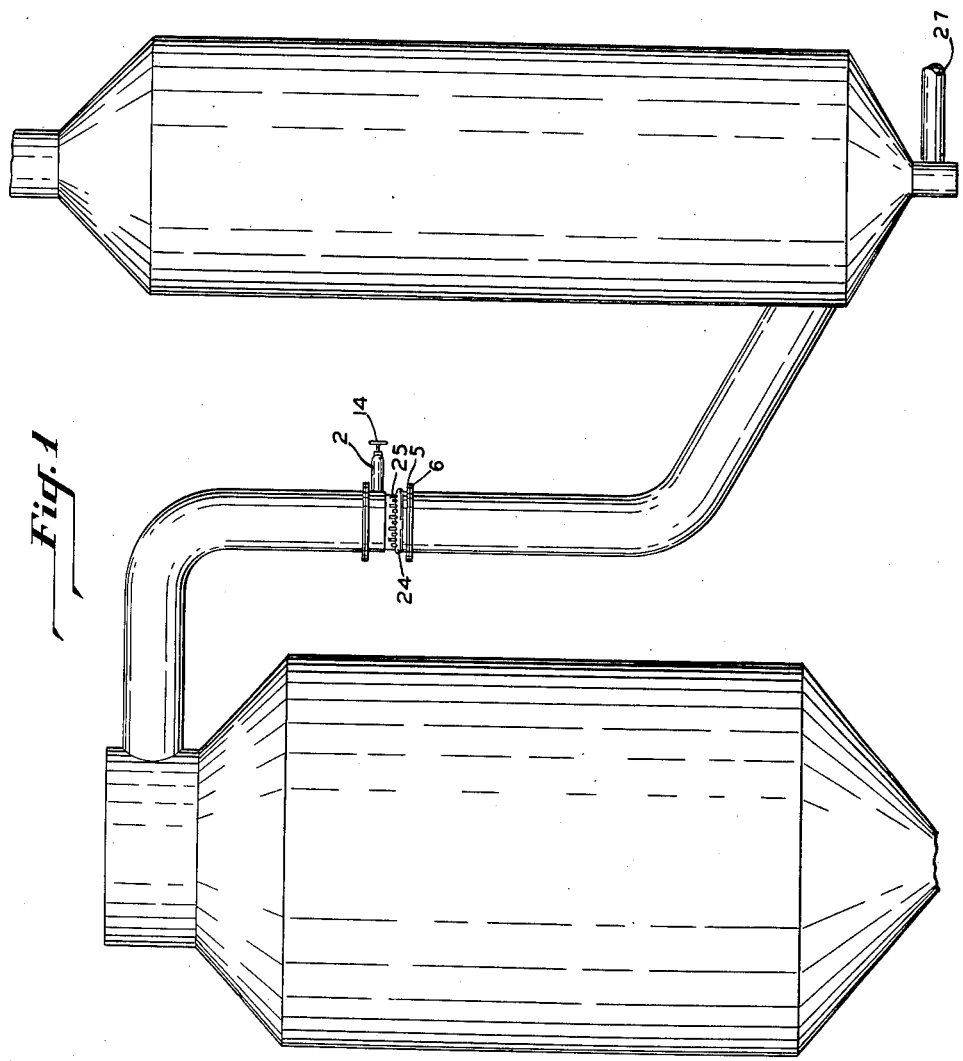

Referring to FIGURE 2, there is shown a valve bonnet 2 secured to a section of pipe the same diameter as the pipe into which the device is to be inserted. This section of pipe 4 is provided with flanges 5 corresponding with flanges 6 (FIGURE 4) welded to the existing pipe structure. The unit is secured in position by means of bolts 7 or rivets passing through these complementary flanges.

Housed within the bonnet 2 is a slidable valve 8 which slides on two triangular guide ridges 9 extending across the pipe section 4. The pipe section 4 is closed throughout its entire area by the plate 10 except for an elongated opening or orifice 11 extending across substantially the entire diameter of the pipe 4 in a direction in alignment with the valve bonnet 2. The ridges 9 on which the valve slides are parallel to one another and are along the sides of the orifice 11. The valve 8 is provided with slide grooves 12, one on each side, to conform to the ridges 9 and to slide therealong. The sliding valve has a cover 13 across the top which closes the top. A hand wheel 14 which is keyed to a shaft 15 passing through the valve bonnet 2 provides a manual adjustment for the valve mechanism. The shaft 15 carries a screw thread 16 for engagement with the screw thread 17 in the bonnet 2 so that rotation of the hand wheel slides the valve along the ridges 9 to partially close the orifice 11.

To insure free movement of the valve 8, a high pressure water line 18 is connected to the valve bonnet 2. This fills the bonnet with water and the valve is provided with several water inlets 19 which admit water to the interior of the valve 8. Water outlets designated by the numeral 20 are provided to permit water to pass from the interior of the valve 8 onto the plate 10 and onto the ridges 9. This constant flow of water prevents the dust and dirt carried by the gas from clogging the slide grooves 12 making it difficult to adjust the size of the orifice 11 through which the gas passes. In addition to preventing the dirt from impeding the movement of the valve 9, this water also prevents leakage of the gas around the valve 9.

Referring now to FIGURE 4, the elongated orifice 11 is shown in cross section. The plate 10 carries a super refractory material 21 right up to the edge of the orifice 11. The orifice 11 is preferably lined with a refractory material or a metallic wear plate 22 to prevent erosion caused by the passage of the gas therethrough.

The wear plate 22 lining the orifice 11 is drilled as shown in FIGURE 5 to accommodate a plurality of water jets 23. These water jets 23 are connected to manifolds 24, one on each side of the orifice 11, by means of connecting pipes 25. These water jets are provided along the entire length of the elongated orifice 11 on both sides thereof. The top row and bottom row on each side are staggered and the jets on the opposite walls are staggered from one another. The water is supplied to the jets 23 from the manifolds 24 under sufficient pressure to force the stream of water completely across the orifice 11, penetrating the depth of the gas stream passing therethrough. These jets 23 are provided with self-cleaning nozzles which can be manually operated by the valves 26. During normal operation, the gas will pass through the orifice at a velocity of about 200 miles per hour. The water is supplied to the orifice 11 in volumes ranging from three to ten gallons per 1,000 cubic feet of gas flowing. The gas flowing at this high velocity atomizes the water and carries the fine mist along with the stream of gas to the gas washer. At the washer, the water with the dirt carried thereby passes from the water discharge port 27 in the bottom of the washer along with the water which passes down through the washer.

The orifice 11 should be of such size that when the blast furnace is operating at full capacity the gases passing from the dust catcher to the gas washer can be accommodated by the orifice and will pick up sufficient water while passing through the orifice to remove all gas laden foreign matter. At such times when it becomes necessary to operate the furnace at partial capacity or during a reduced blowing period, in order to maintain the proper velocity at the orifice 11 to atomize the water, the valve 8 is partially closed to reduce the size of the orifice 11 to a degree sufficient to maintain the proper velocity. This adjustment of the valve 8 can be done manually as here illustrated or can be done automatically by suitable control equipment.

Because of the high temperature of the gases leaving the dust catcher, it is necessary that the gas duct be lined with fire brick. However, the water cools the gas as it passes through the orifice 11 to such an extent that it is not necessary to have the remainder of the gas line leading from the orifice to the gas washer lined with refractory material. This cooling of the gas effected by the water also greatly reduces the amount of temperature shock exerted at the bottom of the gas washer and prevents cracking of the refractory packing at this point.

It will be obvious to those skilled in the art that I have developed an adjustable gas scrubber which can be easily positioned in the gas line between the dust catcher and gas washer to remove a major portion of the gas borne particles before the gas enters into the gas washer.

I claim:

An apparatus of the type described, the elements comprising a restricting plate positioned in a gas line, said plate being provided with an orifice in alignment with the direction of travel of the gas stream, a slide for movement over said orifice to regulate the size thereof, means for controlling the position of the slide, a plurality of parallel rows of water jets positioned on opposed sides of the orifice, the jets in one row being in staggered relationship with respect to the jets in the other row of jets on the same side of the orifice and being in staggered relationship with the jets in the diametrically opposed row of jets.

References Cited in the file of this patent
UNITED STATES PATENTS

| | | |
|---|---|---|
| 879,149 | Cunningham | Feb. 18, 1908 |
| 1,672,192 | Aseltine | June 5, 1928 |
| 1,724,942 | King | Aug. 20, 1929 |
| 2,604,185 | Johnstone et al. | July 22, 1952 |
| 2,630,293 | Smith | Mar. 3, 1953 |
| 2,631,759 | Hoopes | Mar. 17, 1953 |
| 2,669,416 | Hilton | Feb. 16, 1954 |
| 2,797,904 | Voorheis | July 2, 1957 |